United States Patent [19]

Laky

[11] 3,807,784
[45] Apr. 30, 1974

[54] CARGO HOOK (AUTOMATIC/SEALED)
[75] Inventor: Elmer Laky, Cranford, N.J.
[73] Assignee: Breeze Corporations, Inc., Union, N.J.
[22] Filed: Mar. 5, 1973
[21] Appl. No.: 338,260

[52] U.S. Cl.............................................. 294/83 R
[51] Int. Cl............................................. B66c 1/36
[58] Field of Search........ 294/75, 82 R, 83 R, 83 A, 294/83 AB, 83 AA, 104; 24/241 SB; 89/1.5 G; 244/137 R

[56] References Cited
UNITED STATES PATENTS
3,046,598  7/1962  Daugherty..................... 294/83 R X
2,736,599  2/1956  Coffing.............................. 294/83 R
3,224,804  12/1965 Campbell........................... 294/83 R
3,575,459  4/1971  Coblenz............................ 294/83 R
3,630,562  12/1971 Metz................................. 294/83 R Primary Examiner—Richard E. Aegerter
Assistant Examiner—Johnny D. Cherry
Attorney, Agent, or Firm—Albert F. Kronman, Esq.

[57] ABSTRACT

A cargo hook particularly suited for operations from a helicopter includes a sealed split housing, a toggle linkage within the housing which prevents accidental release of the hook and a cam, responsive to a rotary solenoid to urge the toggle linkage over center when it is desired to open the hook. The only moving part of the cargo hook outside the housing is the load beam.

11 Claims, 5 Drawing Figures

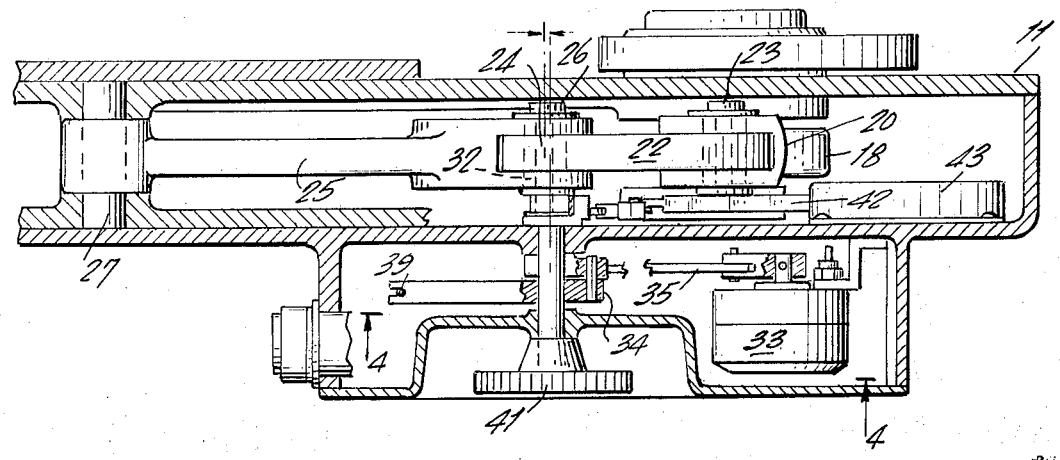
FIG. 2
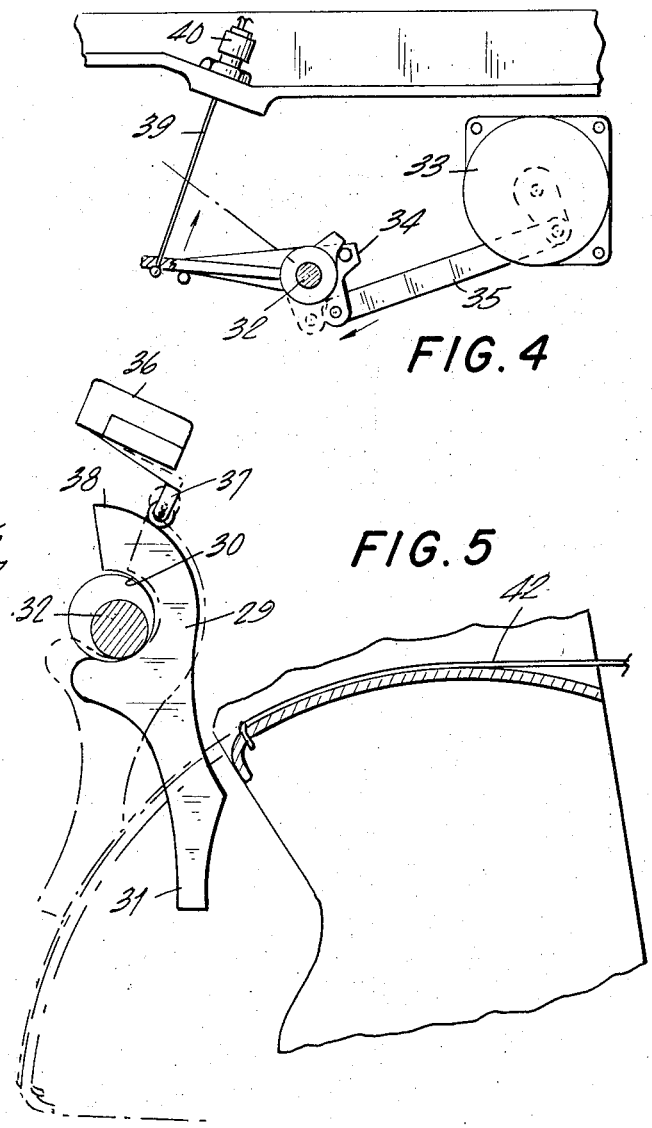
FIG. 4
FIG. 5
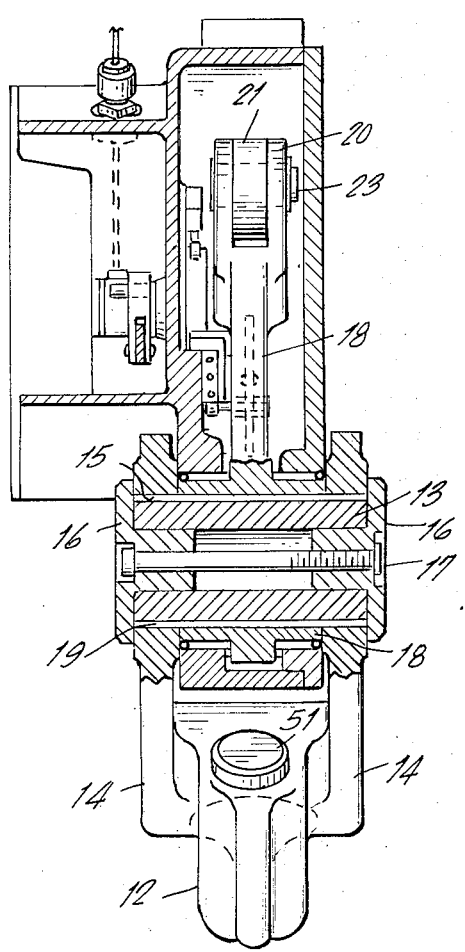
FIG. 3

CARGO HOOK (AUTOMATIC/SEALED)

BACKGROUND OF THE DISCLOSURE

Cargo hooks such as are used in helicopter operations are exposed to a wide variety of conditions which substantially affect their reliability. Dirt, salt water, grime and other foreign material often enter the cargo hook mechanism during use. Where there is little or no ground crew assistance, the hook often strikes the ground and other objects repeatedly.

In certain prior art hooks, a sudden decrease in the weight of the load upon the load beam of the hook, such as occurs when the load inadvertently strikes the ground or other object, results in the accidental release of the load.

Still other prior art cargo hooks require a substantial amount of force to actuate the load beam control mechanism.

Accordingly, it is an object of the present invention to provide a cargo hook which will remain operative under severe ambient conditions.

Another object of the present invention is to provide a cargo hook which is not prone to accidental opening.

A further object of the present invention is to provide a cargo hook which lends itself to use in helicopter operations where there is little or no ground crew assistance.

Still another object of the present invention is to provide a cargo hook which does not require large amounts of power for the actuation of its load beam.

SUMMARY OF THE DISCLOSURE

In a preferred form of the present invention a swingable load beam is pivotally secured to a splined shaft journalled within a sealed hollow housing. Rotation of the shaft is controlled by a toggle linkage operated by a remotely controlled solenoid. When the load beam is closed the toggle linkage is overcenter in one direction. When the load beam is to be released the toggle linkage is shifted by the solenoid past the center. All of the moving parts of the cargo hook other than the load beam are sealed within the housing.

BRIEF DESCRIPTION OF THE DRAWINGS

In the accompanying drawings forming part hereof corresponding parts have been given the same reference numerals, in which drawings:

FIG. 2 is a sectional view taken on line 2—2 in FIG. 1 looking in the direction of the arrows.

FIG. 3 is a sectional view taken on line 3—3 in FIG. 1 looking in the direction of the arrows.

FIG. 4 is a fragmentary view taken on line 4—4 in FIG. 2.

FIG. 5 is a fragmentary view in side elevation, somewhat enlarged, of a portion of the release mechanism shown in FIG. 1.

GENERAL DESCRIPTION

Figure 1:
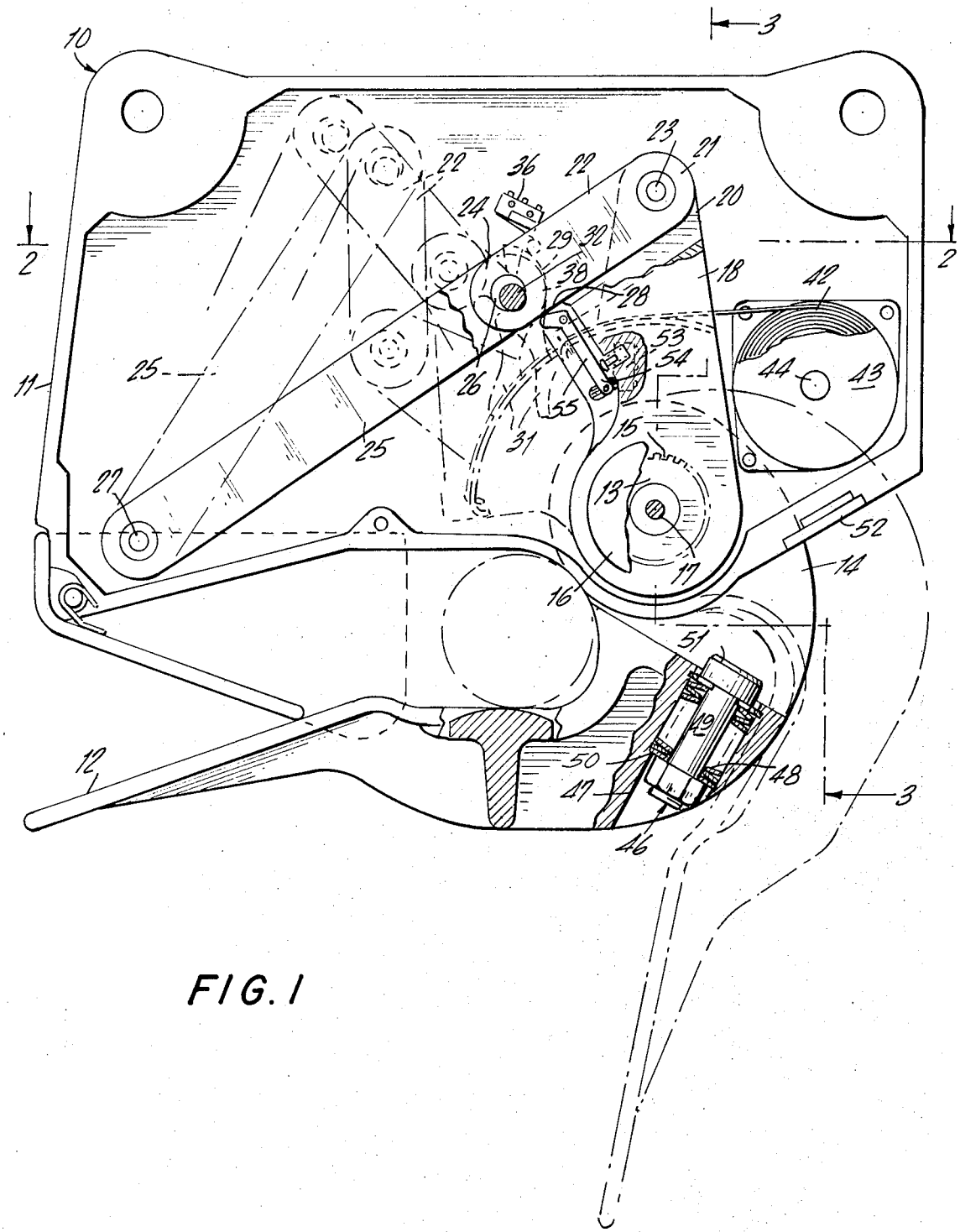
FIG. 1 is a view in side elevation, partly broken away, of a complete cargo hook according to the present invention, with the housing open.

Referring to the drawings and particularly to FIG. 1, reference numeral 10 indicates a cargo hook having a hollow housing 11 formed of flanged, opposed side walls and a swingable load beam 12 secured thereto. The housing is longitudinally split and sealed along its abutting edges to prevent foreign matter from reaching the moving parts contained therein.

A splined shaft 13 is transversely journalled within the housing 11 as best shown in FIG. 3 and extends beyond the housing walls on each side thereof. The load beam 12 is forked as indicated at 14 and provided with internally splined bores 15 through which the ends of the shaft 13 are slipped. The load beam 12 is retained upon the shaft 13 by end caps 16 and bolt 17.

As shown in FIGS. 1 and 3, a bell crank 18 having an internally splined bore 19 is also carried upon the splined shaft 13. The bell crank 18 is completely enclosed within the housing 11. The free end 20 of the bell crank 18 is coupled to the outer end 21 of a short connecting link 22 by a pin 23.

The opposite end 24 of the link 22 is freely secured to one end of a driving link 25 by a pivot pin 26. The other end of the driving link 25 is pivotally secured within the housing upon pivot pin 27. The pivot pin 26 which joins the end of the link 22 to the driving link 25 is displaced a small distance over the center line described by the pin 23 and the pivot pin 27. When a load is present on the load beam 12, reaction through the bell crank 18 keeps the mechanism locked over center against a stop 28 on the bell crank 18.

A retaining cam 29 (best shown in FIG. 5) having a concave cam face 30 and an elongated actuating arm 31 partially encircles the pivot pin 26 to positively restrain it from accidental release during negative "g" force condition. Such may occur when the load carried by the hook strikes the ground or some other object, or during turbulent flying conditions. The retaining cam 29 is secured to a small shaft 32 journalled in the housing 11.

When it is desired to release the load beam 12 and permit it to swing from the position shown in solid lines in FIG. 1 to the dashed line position, the rotary solenoid 33 is energized (see FIGS. 2 and 4). The solenoid control means consist of well-known electrical circuits and they are not shown. The solenoid 33 is coupled to a release bell crank 34 by a flat bar link 35. The release bell crank 34 is secured to the shaft 32 of the retaining cam 29. As the solenoid 33 swings the release bell crank 34 it rotates the shaft 32 which thereupon causes the retaining cam 29 to rotate. The concave face 30 of the retaining cam 29 lifts the pivot pin 26 from its over-center locked position to an over-center release position. The load on the load beam 12 will cause it to swing open upon the splined shaft 13 to release the load. The links 22, 25 will then move into the positions shown in dahsed lines in FIG. 1.

A microswitch 36 with its control arm 37 riding upon the outer surface 38 of the retaining cam 29 is employed to signal the operator that the retaining cam 29 has released the pivot pin 26 and permitted the load beam to open.

In the event the rotary solenoid 33 should fail, the load can be released manually by pulling the release cable 39 which is secured at one end to the bell crank 34 within the housing. The outer end of the release cable 39 is passed through an opening in the housing 11 and secured to a small actuating handle 40.

The load beam 12 may also be released by ground crewmen by the use of an external release knob 41 (see FIG. 2). The knob 41 is secured to the retaining cam shaft 32 which extends through the housing 12 for this purpose. It will be apparent that manual rotation of the shaft 32 will produce the same sequence of operations set forth above in connection with the operation of the solenoid 33.

Once the load is released, the load beam 12 is automatically returned to its original position. This operation is performed by a clock spring mechanism 42, best shown in FIGS. 1 and 2. The clock spring 42 is carried within a small case 43 in the housing 11. One end of the spring 42 is secured to a shaft 44 and the free end 45 is coupled to the bell crank 18. When the load beam 12 is released, the bell crank 18 swings in the direction indicated in dashed lines in FIG. 1. The clock spring 42 is extended and thereby tightened. Upon the removal of the load from the load beam 12, the energy stored in the clock spring 42 is sufficient to pull the load beam 12 back to its original position. The pivot pin 26 is also returned to its over-center locked position.

When the load beam 12 is released under load a substantial amount of energy may be imparted to the load beam due to gravity. This energy must be dissipated to prevent damage to the load beam 12 and the housing 11. A damper assembly 46 is therefore provided at the rear of the load beam 12 as shown in FIG. 1.

The damper assembly 46 is contained within a two diameter bore 47 in the load beam 12. A series of Belleville washers 48 on a bolt 49 are secured within the bore 47 with the washers 48 resting upon a step 50 within the bore and the head 51 extending outwardly in the direction of the housing 11. A hardened anvil 52 is secured to the housing in the path of the bolt head 51 as the load beam 12 swings open. The rate of energy absorption and the travel of the damper assembly may be adjusted through various arrangements of the Belleville washers as is well-known in the art.

Automatic touchdown release of cargo as it reaches the ground is also provided for in the present invention as shown in FIG. 1. By means of electrical switch means (not shown) the pilot can energize the normally closed microswitch 53. With a load on the load beam 12 and the pivot pin 26 over-center in the latched position, a spring loaded sear 54 holds the microswitch 53 open. When the cargo touches the ground, the load on the beam 12 is suddenly reduced by some finite value. This reduction in load is sensed by the sear, one end of which bears against the retaining cam 29. By means of an elongated arm 55 on the sear, this slight reduction in load is amplified so as to close the microswitch 53 and energize the rotary solenoid 33 to release the load. The circuits and power source for the solenoid 33 and microswitch 53 are conventional, form no part of the present invention, and need not be illustrated.

From the foregoing it will be seen that there has been provided a cargo hook assembly in which all of the mechanism is sealed within a housing protected from foreign material such as dust and moisture. The cargo hook is capable of a variety of modes of operation and can be controlled from a remote station electrically or manually at the hook housing.

Having thus fully described the invention, what is claimed and sought to be protected by letters patent is:

1. A cargo hook assembly comprising a sealed hollow housing formed of opposed flanged side walls, a splined shaft in the housing transversely and rotatably carried between the side walls and extending outwardly therefrom, a load beam secured to the extended portions of the splined shaft and swingable therewith, a bell crank secured to the splined shaft within the housing, a linkage within the housing comprising a first link freely coupled by a pivot pin to a driving link, said first link being pivotally secured to the free end of the bell crank, and said driving link being pivotally secured at its end opposite the first link to the housing, a retaining cam swingably carried within the housing, a cam face on the retaining cam for engagement with the pivot pin at an over-center position of the said pin, and drive means to swing the retaining cam to move the pivot pin to an opposite over-center position whereby the load beam will be released as the splined shaft rotates within the housing.

2. A cargo hook assembly according to claim 1 in which the load beam is forked to receive the housing therebetween and provided with a splined bore at each of the forked ends thereof for engagement with the ends of the splined shaft.

3. A cargo hook assembly according to claim 1 in which the bell crank is formed with a stop to limit the over-center travel of the linkage in the locked position.

4. A cargo hook assembly according to claim 1 in which the driving cam face is concave to receive and retain the pivot pin in the locked position.

5. A cargo hook assembly according to claim 1 in which the drive means is a source of rotary power.

6. A cargo hook assembly according to claim 1 in which the drive means acts through a release bell crank secured to a shaft upon which the retaining cam is also held.

7. A cargo hook assembly according to claim 1 in which the drive means is a rotary solenoid.

8. A cargo hook assembly according to claim 6 in which the shaft of the release bell crank extends through the housing and is provided with a manual control knob exterior of the housing.

9. A cargo hook assembly according to claim 1 in which spring means carried within the housing and secured to the load beam returns the said beam to its closed position.

10. A cargo hook assembly according to claim 9 in which the spring means is a clock spring.

11. A cargo hook assembly according to claim 1 in which a sear is swingably mounted adjacent the linkage and in contact therewith, a microswitch is operatively disposed against the sear and the drive means is actuated by the microswitch in response to movement of the sear, whereby slight movement of the linkage due to a reduction of weight on the load beam will cause the load beam to be released.

* * * * *